R. B. ROBERTSON-SHERSBY-HARVIE

WAVE GUIDE ACCELERATOR SYSTEM

Original Filed Oct. 11, 1949 2 Sheets-Sheet 1

INVENTOR
ROBERT BRUCE ROBERTSON-SHERSBY-HARVIE,

BY Stevens, Davis, Miller & Mosher

ATTORNEYS

R. B. ROBERTSON-SHERSBY-HARVIE

WAVE GUIDE ACCELERATOR SYSTEM

Original Filed Oct. 11, 1949 2 Sheets-Sheet 2

INVENTOR
ROBERT BRUCE ROBERTSON-SHERSBY-HARVIE,

BY
Stevens, Davis, Miller & Mosher
ATTORNEYS

United States Patent Office

Re. 24,146
Reissued May 1, 1956

24,146

WAVE GUIDE ACCELERATOR SYSTEM

Robert Bruce Robertson-Shersby-Harvie, Buntingford, England, assignor to National Research Development Corporation, London, England, a British corporation Original No. 2,698,381, dated December 28, 1954, Serial No. 120,703, October 11, 1949. Application for reissue October 28, 1955, Serial No. 543,639

Claims priority, application Great Britain October 18, 1948

4 Claims. (Cl. 250—27)

Matter enclosed in heavy brackets [ ] appears in the original patent but forms no part of this reissue specification; matter printed in italics indicates the additions made by reissue.

This invention relates to electrical particle or ion accelerators in which moving charged particles such as ions or electrons are accelerated under the influence of a travelling electromagnetic wave, of phase velocity substantially equal to the particle velocity. In such accelerators, generally referred to as travelling-wave linear accelerators, the propagation path for the wave and the path of the moving particles, which will hereinafter be referred to as ions, is usually arranged in a substantially linear form, as distinct from the closed-loop form of the ion path in such particle acceleration devices as the synchrotron.

A travelling wave linear accelerator usually consists of a high-frequency source feeding power into a waveguide accelerating tube which is terminated by a matched dummy load which absorbs without reflection the high-frequency power remaining at the output end of the waveguide tube. The waveguide will be so arranged by suitable dimensioning, loading or corrugation of the waveguide inner surface that the phase velocity of the electromagnetic wave propagated down the guide is suitable for coupling to moving ions to occur. For acceleration at velocities below the relativistic region the properties of the guide may be so varied along its length that the phase velocity of the wave is a function of position along the guide in order that the travelling wave and accelerating ions may be kept in phase synchronism.

In the following description and claims, it is to be understood that the term "waveguide" relates to a structure having a boundary surface and wherein an electromagnetic wave is supported in the space adjacent said boundary surface by means of circulating currents in the boundary surface.

The following description will be given with reference to the accompanying drawings in which.

Figure 1:
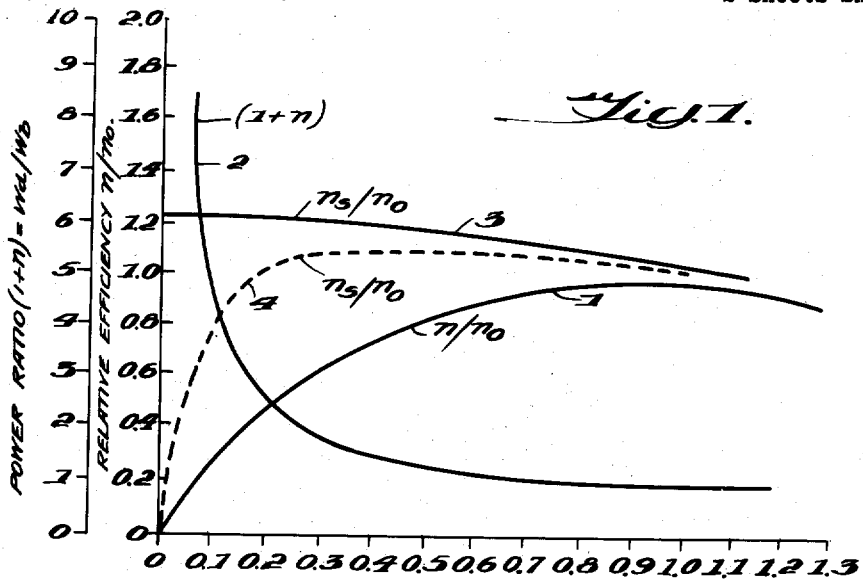
Fig. 1 is a diagram showing a number of explanatory curves.

The energy of an ion at the output end of a travelling-wave linear accelerator, expressed as an equivalent voltage, is given by the integral, over the length of the accelerator, of the peak accelerating field. It is thus apparent that the output energy is, to a first approximation, proportional to the accelerator length, but that attenuation of the travelling wave eventually offsets the effect of increased length. From the point of view of R. F. power economy the best accelerator would obviously have such a length that the R. F. power remaining at the output end was negligible; the provision of such an accelerator would, however present practical difficulties and may involve an accelerator of undue length. A "figure of merit" may be obtained for an accelerator design which is given by:

$$\eta = V^2/WL$$

where V is the output ion energy, W is the power supplied by the R. F. source and L is the accelerator length. If this factor is plotted against accelerator length a curve such as that indicated at 1 in Fig. 1 of the accompanying drawings is obtained. The curves of Fig. 1 actually illustrate the relation between the relative "efficiency," the ratio of $\eta$ to an optimum "efficiency" $\eta_0$ against the ratio of actual length L to the length $L_0$ for optimum "efficiency." As the length is increased from zero, the "efficiency" factor $\eta_0$ increases to an optimum value; below this length the accelerator is insufficiently long to make optimum use of the R. F. power. As the length is increased beyond the optimum the "efficiency" factor falls as the increasing attenuation partially offsets the effect of increasing length upon the output energy V. It can be shown that the optimum value of $\eta$ corresponds to a length $L_0$ having an attenuation of 1.25 nepers (approximately 11.08 db), so that with an accelerator of optimum length only about 10% of the R. F. power is wasted.

In practice considerations of frequency stability and constructional tolerances generally prevent linear accelerators being made as long as the optimum length. It will be obvious that as the length of the waveguide employed to propagate the travelling wave is increased, the departure of the frequency of the R. F. power supply from the assigned value which can be tolerated before the travelling wave and moving ions become out of phase at the output end of the accelerator is reduced. In other words the bandwidth of the accelerator becomes so narrow as its length is increased that the frequency of the R. F. source cannot easily be maintained within the band. Errors in dimensions of the waveguide and errors in the dimensions and positioning of any corrugations or other loading elements in the waveguide operate, in the same manner as changes in frequency, to cause the wave and ions to get out of phase, and it is apparent therefore that as the accelerator length is increased the permissible tolerances on dimensions of the accelerator structure may become impossibly small. As a result of these factors practical travelling-wave linear accelerators are made considerably less than the optimum length with the result that a considerable fraction of the R. F. power supplied is wasted in the dummy load.

The low power-efficiency inherent in practical designs of travelling-wave linear accelerators would be of no importance from a purely economic point of view based on running cost; however, the size of R. F. power supply available is limited and considerable difficulty therefore exists in obtaining the high peak fields required to produce ions of energies above a certain level with the practicably achievable lengths of accelerator.

It is an object of the present invention to provide a travelling-wave linear accelerator arrangement which is of less than the optimum length and in which the "figure of merit" is improved over the value obtainable with known arrangements, by utilization of the R. F. power available at the output of the waveguide accelerating tube to reinforce the R. F. power supplied, instead of dissipating the output power in a dummy load, so that for a given size of R. F. power supply the peak value of the accelerating field is increased.

It is a further object of the invention to provide a travelling-wave linear accelerator system which is easier to manufacture than known travelling-wave linear accelerators of comparable performance and which is capable of operating over a band of frequency, comparable with the bandwidth obtainable with linear accelerator systems which are of short length and have a relatively low performance, while retaining a relatively high performance.

In considering how to make use of the R. F. power which would normally be wasted in a straight-forward travelling-wave linear accelerator, it would appear that an arrangement such as that illustrated in Fig. 2 would enable all the R. F. power supplied to be utilized. The R. F. power source 1 is coupled to the input of the waveguide 2, which supports the travelling wave, by means of a bridge 3. Power is fed back from the output end of the waveguide to the bridge where it is combined with the power from source 1. The directions of power flow are indicated by arrows and it will be apparent that the power flux in the accelerator waveguide is greater than that supplied from the source; in this respect the system is similar to a resonant system.

Figure 2:
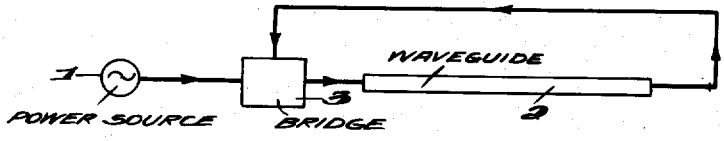
Fig. 2 is a diagrammatic representation of an arrangement illustrating the basic principles of the invention.

A non-dissipative bridge may be designed, composed of suitable waveguide circuit elements, which will satisfy the steady state power conditions of Fig. 2 but such a bridge cannot be designed which will also satisfy the conditions necessary to secure stability. The stable state of the system illustrated in Fig. 2 requires power to circulate in both directions round the loop including the accelerator waveguide, the system then functioning as a resonant system. In the arrangement according to the invention the system is stabilized by introducing dissipative elements into the bridge; one such power sink is sufficient and the accelerator arrangement may be as illustrated in Fig. 3 in which the dissipative element 4 of the bridge is indicated as being external to the bridge 3 and connected as the load on one of the four outlets a, b, c, d from the bridge, which may be regarded as being non-dissipative in itself.

The detailed design of the bridge 3 is defined by stipulating the steady state power ratios relating the power from the source ($W_b$), the feed-back power ($W_a$), the power fed to the accelerator waveguide ($W_d$) and the power dissipated in the absorbing load 4 ($W_c$); also the arms a and b are mutually conjugate, i. e., there can be no power transference between them. The conjugate relationship of arms a and b of the bridge system ensures that; firstly, all the power flows through the accelerator waveguide in the desired direction, and secondly; that the impedance of the input arm b is independent of the amount of power fed back into arm a. This latter condition ensures that the input impedance of the complete system remains constant during the period after application of power while the circulating power is being built-up in the system.

Figure 3:
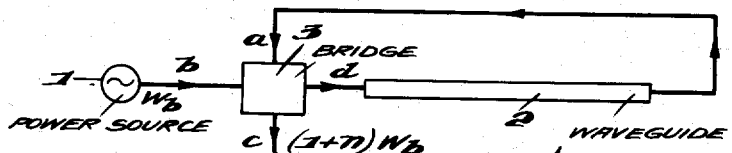
Fig. 3 is a diagrammatic representation similar to Fig. 2, illustrating in more precise form one possible arrangement according to the invention.

The power ratios of the bridge system must obviously be designed to fit the attenuation of the accelerating waveguide and if the ratio of power entering the waveguide to power leaving the waveguide is taken to be $(1+n)/n$, where n is determined by the attenuation in the guide, then the steady-state power levels will be as indicated in Fig. 3. The power supplied from the generator will be $W_b$, the fed-back power $W_a$ will equal $nW_b$ and the power entering the waveguide will be $(n+1)W_b$. $W_c$ will be zero. It will be seen that if the special case is selected in which $n=1$ then the generator power and fed-back power are equal. In this case the bridge system may be realised by straight forward known waveguide circuits such as the hybrid-T joint (or magic-T) or the so-called "rat-race" junction. If a hybrid-T junction is employed as the bridge system for the special case of 2:1 ratio of input to output power in the accelerator waveguide the T-junction will be formed of waveguides, all of the same cross-section, the generator and feed-back path being coupled to the E- and H-plane T-junction arms while the inline sections feed the accelerator waveguide and the dummy load respectively.

Alternatively an arrangement of this latter kind may be employed with the input and output arms interchanged. It will readily be understood that such an arrangement, in the steady-state condition and with the correct phase shift in the feedback path, will cause the waves entering the two T-junction arms to add in phase in one direction (that going to the accelerator) while in the reverse direction (feeding the dummy load) the two waves will cancel. Similar considerations may be applied to the employment of a four-armed "rat-race" junction under the special condition of $n=1$.

The enhanced efficiency of "figure of merit" of the accelerator system incorporating power feedback results from the power flux through the actual accelerator waveguide being increased $1+n$ times. Thus if $\eta_s$ is the steady-state figure of merit for the accelerator system with feedback then the relative figure is given by:

$$\eta_s/\eta_0=(1+n)\eta/\eta_0$$

where $\eta$ and $\eta_0$ refer to the actual and optimum figures of merit of the same accelerator waveguide without feedback. The factor $(n+1)=W_d/W_b$ is a measure of the power magnification of the system and is a function of the length of the accelerator waveguide, diminishing as the length increases. The manner in which this factor varies with the relative length $L/L_0$ of the accelerator is indicated in curve 2 of Fig. 1.

Curve 3 of Fig. 1 indicates how, assuming no loss in the feedback path, the figure of merit $\eta$ varies with the relative length of the accelerator. It will be seen that the feedback efficiency decreases as the length is increased, approaching the value obtained without feed-back as the length increases. With short accelerator lengths the system incorporating feedback can yield efficiencies or figures of merit even greater than the value obtainable with the optimum length without feedback.

Although the loss in the waveguide constituting the feedback path will in general be small compared with the forward loss in the accelerating waveguide, other loss will occur in practice in the feedback path and will modify the efficiency. If constant attenuation is assumed in the feedback path, such as might be caused by losses in the couplings, then the effect clearly becomes more important as the accelerator length is reduced because the circulating power is increased. If the bridge system is correctly proportioned to take account of the loss in the feedback path, the practical relationship between relative factor of merit and relative length will be as shown in curve 4 of Fig. 1, which indicates the relationship for an attenuation in the feedback path of approximately half a decibel.

Figure 4:
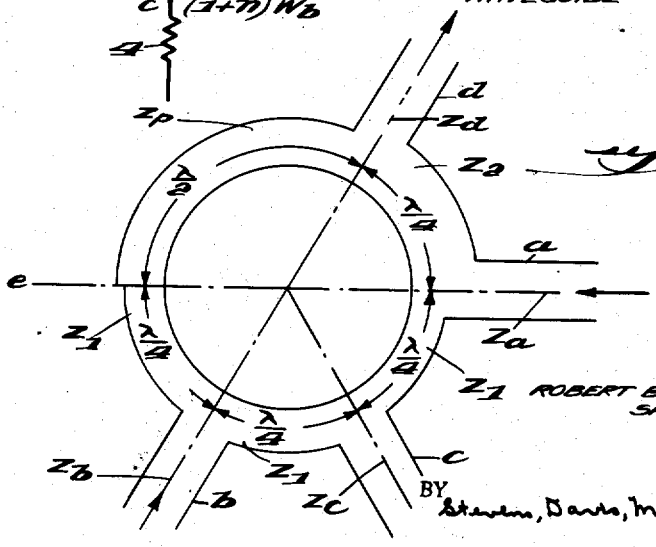
Fig. 4 is a diagrammatic representation of a part of the arrangement shown in Fig. 3.

One practical embodiment of the bridge system of the complete travelling-wave linear accelerator system of the invention is illustrated in Fig. 4 for the general case in which the input/output power ratio $(n+1)/n$ for the accelerating waveguide, has a value other than 2. The bridge system of Fig. 4 is a modified "rat-race" junction arranged with the dimension of the various sections of waveguide adjusted to provide the required impedance match and power distribution conditions.

All the waveguide sections of Fig. 4 are of rectangular cross-section, supporting $H_0$ mode waves, the narrow dimensions of the guide cross-sections being in the plane of the paper. The length measured around the annular waveguide is $6\lambda/4$ and the four arms a–d (corresponding to the bridge connections a–d of Fig. 3) form series-T or E-plane T junctions spaced around the circumference of the annular guide as shown.

For transmission to occur through an E-plane T junction the two waves entering or leaving the junction are in anti-phase. Thus if power from the R. F. source is fed in at arm b it will appear from arm d, which may be utilized to feed the input end of the accelerator waveguide, but no power will be supplied to arm a, to which the feedback connection from the remote end of the waveguide is taken. Power is able to pass from arm b to arm c which is terminated by the matched dummy load (4 of Fig. 3). The fed-back power entering the bridge via arm a is able to flow to the arm d but not to the conjugate arm b. Power is able to flow also from the arm a to the arm c. Arm d may alternatively be located in the place e. Under the steady-state conditions of operation the waves reaching arm c from the arms b and a are arranged to cancel by adjustment of their amplitudes by suitable proportioning of the waveguide impedances.

The semicircular portion of the waveguide annulus between arm a and the plane e, which carries the arms b and c is made with a uniform total characteristic resistance $z_1$, while the other semicircular portion is made with two portions of total characteristic resistances $z_2$ and $z_p$ as indicated.

If the impedance of the matched load fed by arm c and also the total characteristic resistance of the waveguide section c is $z_c$, and also the arm d of characteristic resistance $z_d$, is matched to the input of the accelerating waveguide, for correct operation of the bridge with no power entering arm c the following relations must hold:

$$z_d/z_c = z_2/z_1 = n$$

and $$0 < z_p$$

The characteristic resistances of the different sections of the annular guide and the different T arms are adjusted to the appropriate values by suitable variations in the guide dimensions in the directions of the E vectors, as shown. The input impedances presented by the arms a and b are then given by:

$$z_a = \frac{z_2^2}{z_d} + \frac{z_1^2}{z_c} = z_a = (n+1)z_1^2/z_c$$

$$z_b = \frac{z_1^2}{z_d} + \frac{z_1^2}{z_c} = z_b = \left(\frac{n+1}{n}\right)z_1^2/z_c$$

The method of achieving the desired bridge conditions, described above with reference to Fig. 4, is given by way of example only. Other waveguide circuits may be devised to provide the necessary transmission conditions; for example the hybrid-T junction, which was previously described as applied to the special case when n=1, may be modified by adjustment of the characteristic resistances of the various arms to fulfill the conditions required for some other arbitrary value of n in a manner similar to that described for the rat-race junction.

One of the effects of the reduction in length of the accelerating waveguide which is possible with the accelerator system embodying feed-back is that the bandwidth of the waveguide is increased in the same proportion as the reduction in length. However, when the feedback is operating a change of frequency will cause a reduction in circulating power because the generator power and fed-back power will only be properly in phase at one predetermined frequency. This effect may be overcome by introducing a phase changer or line-lengthener into the feed-back path, which may conveniently be adjusted, manually or automatically, to null or minimise the power in the arm c of the bridge. If this adjustment is made the bandwidth of the accelerator system will be determined entirely by the accelerating waveguide and will be the same as if feedback were not used. A short accelerating guide may thus be used to achieve a wide bandwidth, the performance being retained by feedback.

Figure 5:
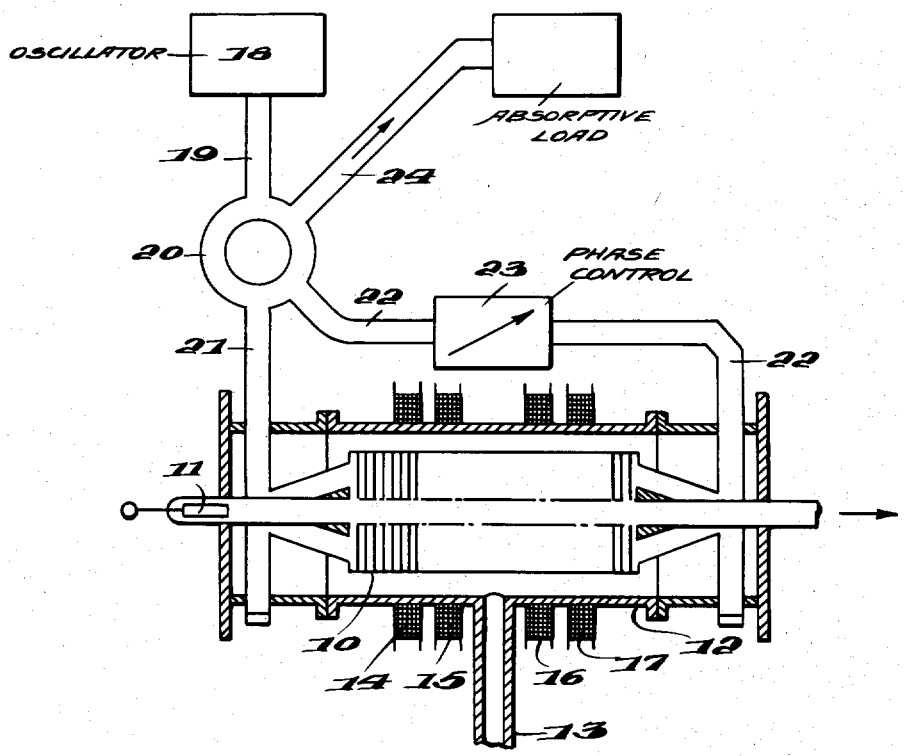
Fig. 5 illustrates a complete linear electron accelerator installation embodying the invention.

Fig. 5 illustrates, diagrammatically, the linear electron accelerator apparatus embodying the invention. The arrangement shown comprises an accelerator waveguide 10 provided with internal corrugations which serve to retard the phase velocity of the radio frequency wave launched in the waveguide so that coupling may take place between the radio frequency wave and a stream of electrons fired axially down the waveguide by means of an electron gun 11. The waveguide is enclosed in a vacuum chamber 12 continuously evacuated through an exhaust tube 13. Focussing coils 14, 15, 16 and 17 enable the electron stream to be maintained axially throughout the guide.

Radio frequency energy from a magnetron oscillator 18 is fed to the accelerator waveguide through a supply waveguide 19, a rat-race waveguide bridge assembly 20 and an input waveguide 21 suitably matched to feed into the waveguide 10.

At the output end of the waveguide 10 a feedback waveguide 22 is matched to the waveguide 10 to receive the radio frequency energy from it and apply this energy through a variable phase control 23 to an arm of the rat-race assembly 20. The fourth arm 24 of the rat-race assembly 20 is coupled to an absorptive load, for example a water load.

I claim:

1. Electromagnetic waveguide structure comprising a rat-race waveguide assembly having a pair of conjugate input arms and a pair of output arms, a utilisation waveguide connected to one of said output arms, a feedback waveguide connected between the output of said utilisation waveguide and one of said input arms, a source of wave energy connected to the other of said input arms and power dissipative means connected to the other of said output arms, the output arm connected to said utilisation waveguide being positioned at a point on said rat-race at which the inputs from said input arms combine to feed said utilisation waveguide, the output arm connected to said dissipative means being positioned at a point on said rat-race at which the inputs from said input arms cancel one another.

2. Electromagnetic waveguide structure as claimed in claim 1 wherein said "rat-race" comprises a closed loop having a first section of characteristic impedance $Z_1$, a second section of characteristic impedance $Z_2$ and a third section of characteristic impedance $Z_p$, a first input arm of characteristic impedance $Z_b$ and a first output arm of characteristic impedance $Z_c$ coupled to spaced points on said first section, a second input arm of characteristic impedance $Z_a$ coupled to the junction between said first and second sections and a second output arm of characteristic impedance $Z_d$ coupled to the junction between said second and third sections, said characteristic impedances $Z_1$, $Z_2$, $Z_p$, $Z_a$, $Z_b$, $Z_c$, and $Z_d$ being correlated by the formulae:

$$\frac{Z_d}{Z_c} = \frac{Z_2}{Z_1} = n$$

$$Z_a = \frac{Z_2^2}{Z_d} + \frac{Z_1^2}{Z_c} = (n+1)\frac{Z_1^2}{Z_c}$$

$$Z_b = \frac{Z_1^2}{Z_d} + \frac{Z_1^2}{Z_c} = \left(\frac{n+1}{n}\right)\frac{Z_1^2}{Z_c}$$

and $0 < Z_p < \infty$, n being an integer.

3. In a linear waveguide electron accelerator, radio frequency energising means comprising a source of radio frequency energy, a bridge assembly connecting said source to the radio frequency input of said electron accelerator, a feedback waveguide connecting the radio frequency output of said electron accelerator to said bridge assembly and phase control means in said feedback waveguide, said bridge assembly being in the form of a "rat-race" comprising a closed loop having a first section of characteristic impedance $Z_1$, a second section of characteristic impedance $Z_2$ and a third section of characteristic impedance $Z_p$, a first input arm of characteristic impedance $Z_b$ and a first output arm of characteristic impedance $Z_c$ coupled to spaced points on said first section, a second input arm of characteristic impedance $Z_a$ coupled to the junction between said first and second sections and a second output arm of characteristic impedance $Z_d$ coupled to the junction between said second and third sections, said characteristic impedances $Z_1$, $Z_2$, $Z_p$, $Z_a$, $Z_b$, $Z_c$ and $Z_d$ being correlated by the formulae:

$$\frac{Z_d}{Z_c}=\frac{Z_2}{Z_1}=n$$

$$Z_a=\frac{Z_2^2}{Z_d}+\frac{Z_1^2}{Z_c}=(n+1)\frac{Z_1^2}{Z_c}$$

$$Z_b=\frac{Z_1^2}{Z_d}+\frac{Z_1^2}{Z_c}=\left(\frac{n+1}{n}\right)\frac{Z_1^2}{Z_c}$$

and $0<Z_p<\infty$, n being an integer.

*4. Electromagnetic waveguide structure comprising a non-dissipative waveguide bridge assembly having a pair of conjugate input arms and a pair of output arms, a utilisation waveguide connected to one of said output arms, a feedback waveguide connected between the output of said utilisation waveguide and one of said input arms, a source of wave energy connected to the other of said input arms and power dissipative means connected to the other of said output arms, the output arm connected to said utilisation waveguide being positioned at a point on said bridge at which the inputs from said input arms combine to feed said utilisation waveguide, the output arm*

*connected to said dissipative means being positioned at a point on said bridge at which the inputs from said input arms cancel one another in the steady state condition.*

References Cited in the file of this patent or the original patent

UNITED STATES PATENTS

| | | |
|---|---|---|
| 2,147,454 | Morton | Feb. 14, 1939 |
| 2,284,751 | Linder | June 2, 1942 |
| 2,367,295 | Llewellyn | Jan. 16, 1945 |
| 2,369,268 | Trevor | Feb. 13, 1945 |
| 2,436,828 | Ring | Mar. 2, 1948 |
| 2,445,895 | Tyrrell | July 27, 1948 |
| 2,545,595 | Alvarez | Mar. 20, 1951 |
| 2,580,007 | Dohler et al. | Dec. 25, 1951 |
| 2,641,731 | Lines | June 9, 1953 |
| 2,653,270 | Kompfner | Sept. 22, 1953 |
| 2,667,597 | Bailey | Jan. 26, 1954 |

FOREIGN PATENTS

| | | |
|---|---|---|
| 117,561 | Australia | Oct. 14, 1943 |
| 628,570 | Great Britain | Aug. 31, 1949 |